A. B. NEWMAN.
METHOD AND APPARATUS FOR CONCENTRATING SULFURIC ACID.
APPLICATION FILED OCT. 28, 1916.
1,294,525.
Patented Feb. 18, 1919.
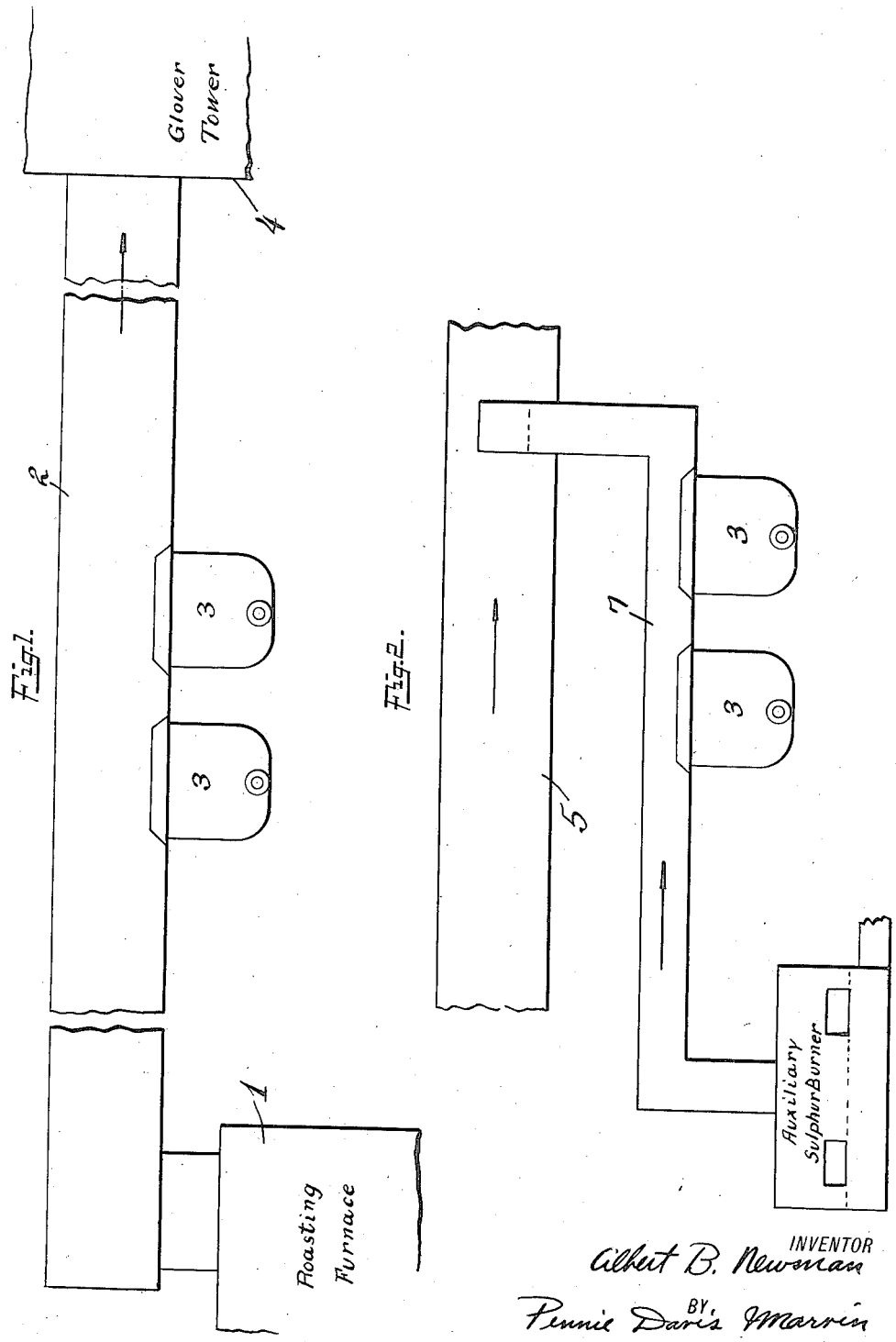

UNITED STATES PATENT OFFICE.

ALBERT B. NEWMAN, OF LANGELOTH, PENNSYLVANIA.

METHOD AND APPARATUS FOR CONCENTRATING SULFURIC ACID.

1,294,525. Specification of Letters Patent. Patented Feb. 18, 1919.

Application filed October 28, 1916. Serial No. 128,201.

*To all whom it may concern:*

Be it known that I, ALBERT B. NEWMAN, a citizen of the United States, residing at Langeloth, county of Washington, State of Pennsylvania, have invented certain new and useful Improvements in Methods and Apparatus for Concentrating Sulfuric Acid; and I do hereby declare the following to be a full, clear, and exact description of the invention, such as will enable others skilled in the art to which it appertains to make and use the same.

This invention relates to a method and apparatus for the concentration of sulfuric acid.

When sulfuric acid, such as produced in Glover towers and having a strength of approximately 60° Baumé, is concentrated in open pans or vessels to a strength of about 66° Baumé, a distillate is produced containing both steam and some acid vapor.

This distillate is usually passed through a condenser of some kind in order to recover as much of the acid as possible. The acid thus collected or recovered may flow back into the concentrating vessel, or it may be pumped to the top of the Glover tower. In the former case, this condensate or dilute distillate, being more dilute than the acid being concentrated, tends to dilute the latter, with a corresponding reduction in the capacity of the apparatus. The uncondensed vapors are commonly allowed to go to waste.

I have found that when condensers are used, the condensed acid attacks the flue system or condenser, which requires to be renewed from time to time.

The present invention relates to a novel method and apparatus wherein the use of condensers is made unnecessary and wherein the distillate is maintained at a temperature above condensation throughout the flue system and thereafter recovered in the Glover tower. The distillate from the concentrating apparatus may thus be kept at a temperature higher than the condensation point of the acid and steam by passing through heated flues directly to the Glover tower, or by combining the distillate while still highly heated with other gases from the roasting furnace on their way to the Glover tower. By keeping the temperature above that of condensation, the capacity of the concentrator is increased because there is no condensate being returned to the concentrating vessels, and the objectionable action of the distillate upon the flue's system is largely avoided or minimized.

In my new process, herein described, lie two distinct commercial advantages over commonly used processes; (1) the recovery of distillate is practically complete, the superheated vapors having a Glover tower and an entire set of chambers in which to condense; (2) the cost of construction, maintenance and operation of a specially-built condensing plant is entirely eliminated.

The invention is illustrated in the accompanying drawings in which—

Figure 1 shows, in diagram, an apparatus embodying the invention and adapted for the practice of the process of the invention; and Fig. 2 shows a modified form of apparatus.

In Fig. 1, the acid concentrating vessels 3 are so arranged with respect to the main sulfur dioxid flue 2, leading from the roasting furnace 1 to the Glover tower 4, that the condensate is combined with the highly heated flue gases and carried with them to the Glover tower. The action of the highly heated flue gases may thus supplement, to a greater or less extent, the concentrating action. At the same time, the distillate is maintained in a highly heated condition, above the temperature of condensation. The sulfur dioxid contained in the flue gases is enriched by the sulfur trioxid from the concentrating vessels. The water vapor or steam from the concentrating vessels is also carried along with the flue gases and enters the Glover tower with them while still in a highly heated condition.

Instead of introducing the distillate directly into the flue gases in the main sulfur dioxid flue, leading from the roasting furnaces, an auxiliary furnace may be used to furnish a current of highly heated gases for carrying away with them the distillate. Such an arrangement is shown in Fig. 2 in which the acid concentrating vessels 3 are arranged so that the distillate enters the flue 7 leading from the auxiliary sulfur burner 6 to the main sulfur dioxid flue 5 which, in turn, leads from the roasters to the Glover tower.

Sulfur is burned in the auxiliary burner 6, adjacent to the concentrating vessels, and the fumes of sulfur dioxid thus produced are combined with the distillate, care being taken that the proper temperature is maintained.

It will, of course, be understood that a larger or smaller number of concentrating vessels may be provided, arranged so that the distillate from them is maintained at the required temperature and is carried along in a highly heated condition to the Glover tower.

It will also be understood that the concentrated acid will be kept at any desired level in the concentrating vessels or pots, removed continuously or intermittently from the concentrating vessels, and cooled to the desired temperature, by methods generally known and now in general use. The main body portions of the concentrating vessels are arranged externally of the flue system and only the open ends of these vessels are in direct communication with the flue system. Only the distillate is thus introduced into the flue system, so that the hot gases from the roasting furnaces are called upon to give up only that amount of heat which is necessary to maintain the distillate above the temperature of condensation during its passage through the flue system. It will, of course, be understood that the main body portions of the concentrating vessels are heated in any suitable manner by an external source of heat independent of the flue system.

With the apparatus of Fig. 1, no additional source of heat is required for maintaining the necessary temperature of the distillate, the heat being supplied by the gases from the main roasting furnaces. In the apparatus of Fig. 2, a small quantity of sulfur is burned in the auxiliary furnace and furnishes enough heat to keep the distillate from condensing in the brickwork of the flues. The arrangement of Fig. 1 has the advantage over that of Fig. 2 that the concentrating vessels are built directly into the flue conducting the gases from the roasters to the Glover tower, and the further advantage that there is usually sufficient heat in these gases to prevent the condensation of the distillate before it gets to the Glover tower.

It will be noted that the present invention provides for the promotion of the concentration operation by removing from the concentrating vessels in a continuous manner the distillate formed therein and by maintaining this distillate above the temperature of condensation; and that the invention presents the further aspect and advantage of maintaining the distillate in a highly heated condition during its passage through the flue system, whereby corrosion and destruction of this system is minimized. Furthermore, the invention provides for the enrichment of the flue gases with the distillate and the recovery of the distillate in the Glover tower or in the succeeding chambers.

What I claim is:

1. The method of concentrating sulfuric acid and of recovering the distillate from the concentrating vessels, which comprises distilling the acid, introducing of the contents of the concentrating vessel only the distillate into the flue system from the roasting furnace to the Glover tower, deriving from the highly heated gases in the flue system that amount of heat which is necessary to maintain the distillate above the temperature of condensation during its passage through the flue system, and recovering the distillate in the Glover tower or in the succeeding chambers.

2. An apparatus for the concentration of sulfuric acid and for the recovery of the distillate resulting therefrom, comprising a roasting furnace and Glover tower connected by a main flue system, an auxiliary sulfur burner having an auxiliary flue communicating with said main flue system, and one or more acid distillation vessels having their open ends in direct communication with said auxiliary flue whereby of their contents only the distillate is introduced into said auxiliary flue and mixed with the hot gases from said auxiliary sulfur burner and carried through the main flue system at a temperature above that of condensation.

3. An apparatus for the concentration of sulfuric acid and for the recovery of the distillate resulting therefrom, comprising a roasting furnace and Glover tower connected by a flue system, and one or more acid distillation vessels having their main body portions arranged exteriorly of said flue system and their open ends in communication therewith whereby of their contents only the distillate is introduced into the flue system and mixed with the hot gases from the roasting furnace and carried therewith at a temperature above that of condensation to the Glover tower.

4. An apparatus for the concentration of sulfuric acid and for the recovery of the distillate resulting therefrom, comprising a flue system for conducting highly heated gases from a roasting furnace to the Glover tower and one or more acid distillation vessels having only their open ends in direct communication with said flue system so that of their contents only the distillate from said vessel is introduced into the flue system, and whereby that amount of heat is derived from said gases that is necessary to maintain the distillate above the temperature of condensation during its passage through the flue system.

In testimony whereof I affix my signature.

ALBERT B. NEWMAN.